3,113,840
PREPARATION OF MANGANESE CARBONYL
Vincent F. Hnizda, Huntington Woods, Mich., assignor to Ethyl Corporation, New York, N.Y., a corporation of Virginia
No Drawing. Filed Dec. 4, 1957, Ser. No. 700,546
5 Claims. (Cl. 23—203)

The present invention is concerned with a novel process for the preparation of manganese carbonyl.

Publications have appeared describing several processes for the preparation of manganese carbonyl. Each of these, however, has reported extremely low yields. One process involves the use of a Grignard reagent in connection with a manganous salt as an intermediate preparatory to reaction with carbon monoxide. In this preparation, according to the literature report, manganese carbonyl was not isolated. Mass spectroscopy indicated that certain manganese carbonyl entities were present in the reaction mixture, but no peak appeared for the compound corresponding to $[Mn(CO)_5]_2$ which has now been established as the formula for manganese carbonyl. Thus, the presence of this compound in the reaction mixture resulting from the Grignard preparation was not established. Further characterization of the product could not be carried out because of the minute quantity of material obtained.

It is, therefore, an object of this invention to provide an improved method for the preparation of manganese carbonyl. Another object is to provide a method for the synthesis of manganese carbonyl in improved yields. It is also an object to provide an improved Grignard method for the synthesis of manganese carbonyl. Other objects of this invention will be apparent from the description which follows.

It has now been found that excellent yields of manganese carbonyl can be obtained by reacting carbon monoxide with an intermediate prepared from an aliphatic Grignard reagent and a manganous halide, so long as the intermediate is prepared, maintained and contacted with carbon monoxide at a temperature below about 5° C. Once the intermediate has come into contact with the carbon monoxide good yields are obtained when the temperature is elevated to from 160 to 200° C. For best results, the carbon monoxide pressure above the intermediate should be at least about 200 p.s.i. before the temperature of the reaction mixtures exceeds 10° C. By this method it is possible to obtain yields of manganese carbonyl in excess of about 18 percent. Yields of this magnitude have never before been possible by the use of a Grignard reagent in the synthesis of manganese carbonyl.

According to the present invention, manganese carbonyl is prepared in greatly improved yields by reacting carbon monoxide under pressure with an intermediate which is prepared at temperatures below about 5° C. by the reaction of an aliphatic organic Grignard reagent with a manganous halide in the presence of an ether carrier. The halides applicable to both the Grignard reagent and the manganous salt have atomic numbers of at least 17 and thus the applicable halides are the chlorides, bromides and iodides, and good results are obtained when any of these are employed.

The aliphatic Grignard reagents applicable to the present invention include those prepared from saturated and unsaturated aliphatic halide compounds. Thus both alkyl and allyl Grignards are applicable to the process of this invention. The allyl Grignard is, however, preferred as it has been found that superior results are achieved by their use.

The preferred solvent and carrier in the process of this invention is a cyclic ether. In particular, excellent results have been achieved by the use of tetrahydrofuran. Another class of solvents which lead to excellent results are the glycol ethers, that is, an ether having a plurality of carbon to oxygen carbon linkages. An example of such a solvent is the diethyl ether of diethylene glycol. In addition, other types of ether solvents may be employed.

The Grignard reagent which is reacted with the manganous halide may be prepared in any convenient manner. This is often accomplished by reacting an organic halide with magnesium metal in the appropriate ether solvent. The quantities of solvent ether ordinarily employed in the preparation of the Grignard reagent and the Grignard-manganous halide intermediate are adjusted so that from 7 to 15 moles of ether in excess of magnesium are present.

After the reaction with carbon monoxide, the product manganese carbonyl is separated from the reaction mixture by such conventional methods as fractional distillation, sublimation and steam distillation. Pure manganese carbonyl exists as the dimer having the formula $[Mn(CO)_5]_2$ and has a melting point of about 155° C. It is essentially insoluble in water, but is soluble in liquid hydrocarbons and is particularly soluble in acetone. The compound finds utility as an intermediate in the preparation of organomanganese compounds and is of particular utility itself as an antiknock additive to gasoline.

The novel method of the present invention will become more apparent by consideration of the following specific examples in which all parts are by weight unless otherwise stated.

*Example I*

Allyl magnesium chloride (1.1 moles) in 890 parts of tetrahydrofuran was cooled to —21° and 0.5 mole anhydrous manganous chloride powder added with stirring. The temperature remained at —20° for nearly 10 minutes before it increased rapidly to —10° where it remained with continued cooling for approximately 20 minutes before the temperature gradually receded over a period of one hour to —16°. The cooling with Dry Ice was maintained as constant as possible during this period. The mixture became a dark yellow brown as soon as the manganous chloride was added and the color density appeared to increase over a period of three hours after which time little change was observed. The mixture was allowed to stir for 24 hours during which time it warmed to a maximum temperature of about 4° C.

With the autoclave precooled to below 0°, the mixture was charged into the autoclave which was then charged with carbon monoxide to 3000 p.s.i. The temperature within the autoclave increased to 28° due to the adiabatic compression of the gas. The temperature then rapidly dropped to about —2° and slowly warmed up as the carbon monoxide was being absorbed. After approximately 2½ hours, the temperature reached 90° and absorption of carbon monoxide become negligibly slow. Heating was continued and at 140° a second absorption took place over a period of about an hour during which time a temperature of about 165° was reached. After this time the pressure remained constant. After cooling and venting, the autoclave was discharged and a yield of 23 percent manganese pentacarbonyl melting at 153–154° was recovered.

This example illustrates that by the process of this invention, i.e., preparing the Grignard-manganous halide intermediate at low temperatures and contacting with carbon monoxide at this low temperature, yields of manganese carbonyl never before possible with a Grignard reagent are obtained. This is in contrast to other techniques of employing a Grignard reagent which are exemplified by the following example.

*Example II*

At room temperature, 1.37 moles of 1.37 normal allyl Grignard in tetrahydrofuran was added to 0.68 mole of anhydrous manganous chloride in a nitrogen atmosphere. The mixture was stirred for one-half hour in the nitrogen atmosphere and charged to a pressure resistant vessel which was not cooled. The vessel was pressured with 2800 p.s.i. carbon monoxide and heated at 150° for one hour. After cooling the vessel and releasing the excess carbon monoxide pressure, the contents were discharged and subjected to steam distillation. Only a trace of manganese carbonyl could be separated from the reaction mixture.

This example illustrates that managanese carbonyl is not obtained in satisfactory yield from a Grignard reagent preparation when the Grignard-manganous halide reaction product is not prepared at low temperature and maintained at low temperature until contacted with carbon monoxide according to the process of this invention.

*Example III*

A solution of 4.7 moles of tetrahydrofuran containing 0.5 mole of ethyl magnesium bromide was cooled to −55° C. at which point 0.5 mole of manganous chloride was added. The solution was allowed to warm slowly and at −35° C., the reaction began to take place and the solution turned brown. There was a heat kick to about −12° C. after which cooling was again applied to reduce the temperature to −25. A second one-half mole portion of ethyl Grignard in tetrahydrofuran was added slowly over a period of 30 minutes, and the temperature was adjusted to −18. The intermediate was then transferred to a pressure resistant vessel which had been precooled to about −20°. The vessel was flushed with carbon monoxide, sealed and pressured to 2000 pounds with a rapid temperature increase to +10° C. After pressuring the vessel, the temperature was slowly raised by heating to about 160° C. Steam distillation and further purification of the product of this reaction yielded in excess of 19 percent manganese carbonyl having a melting point of 153 to 154° C.

When an ethyl Grignard reagent was reacted with manganous halide and the intermediate thus formed subsequently reacted with carbon monoxide without the precaution of maintaining the ethyl Grignard manganous halide reaction product at low temperature until carbonylation, essentially no manganese carbonyl could be recovered from the reaction mixture.

*Example IV*

In this example, n-butyl magnesium bromide is employed as the Grignard reagent and manganous iodide is used in place of manganous chloride. The dimethyl ether of diethylene glycol is employed as the solvent. The manganous salt and the Grignard are mixed at a temperature of −40° C. and the temperature of the mixture is not allowed to exceed 0° C. until the carbon monoxide pressure exceeds 1000 pounds. The carbonylation reaction is conducted at 10,000 p.s.i.g. for 20 hours and an excellent yield of manganese carbonyl results.

*Example V*

2-pentenyl magnesium iodide and manganous bromide are admixed in butyl ether at −30° C. and subjected to a carbon monoxide pressure of 500 pounds at this temperature. The mixture is then warmed to 200° C. and the carbon monoxide pressure adjusted to 2000 pounds. The reaction is allowed to continue for one hour after which time an excellent yield of manganese carbonyl is recovered by steam distillation followed by sublimation.

*Example VI*

The procedure of Example III is followed using isooctyl magnesium iodide as the Grignard reagent. A good yield of manganese carbonyl results.

*Example VII*

The procedure of Example I is repeated except that a maximum carbon monoxide pressure of 200 p.s.i. is employed in the reaction temperatures. This procedure also leads to a good yield of manganese carbonyl.

The end temperature of the carbonylation step in the process of this invention can vary over a wide range. Thus, carbonylation is effected at temperatures as low as the mixing temperature of the intermediate with carbon monoxide and excellent results are obtained employing final temperatures as high as 200° C. or higher. A preferred temperature range for the final heating under carbon monoxide pressure is from about 125 to about 180° C. as it is found that excellent results are achieved when the temperature of the reaction mass under carbon monoxide pressure is raised between these limits and maintained during the reaction period.

A wide range of carbon monoxide pressures are profitably employed in the process of this invention. Thus, pressures ranging from a low of about 200 p.s.i.g. in the initial contacting of the intermediate with carbon monoxide at the low temperature prescribed by this invention to carbon monoxide pressures in the neighborhood of 20,000 p.s.i.g. during the final heating period are employed with success. However, taking into consideration the construction of reaction equipment, a practical range of ultimate pressures in which to conduct this process is from about 1000 p.s.i.g. to about 10,000 p.s.i.g. When reaction equipment permits, pressures in excess of this figure may be employed.

The carbon monoxide is absorbed by the intermediate in the process of forming manganese carbonyl at temperatures as low as −10° C. Absorption may continue for many hours and at elevated temperatures and the time the mixture is allowed to remain in contact with the carbon monoxide depends on the degree of completeness desired and the time economics involved. As the greater portion of carbon monoxide which reacts is consumed first upon admitting the carbon monoxide to the reaction vessel and then upon attainment of the higher reaction temperature, it is found that reaction times of about ten hours or less are sufficient. However, longer reaction time may be employed if desired.

In conducting the process of this invention, it is desirable to continuously agitate the reactants. This agitation may be accomplished by a variety of methods known to those skilled in the art as, for example, stirring, or including a piece of stainless steel in the reaction vessel and rocking the vessel during the reaction period and the like.

Various solvents and diluents compatible with the reactants may be used such as ether, tetrahydrofuran, dioxane, benzene, inert glycol ethers, inert hydrocarbons, nitrogen, argon, and the like, as well as mixtures of various such solvents and/or diluents. Tetrahydrofuran is a preferred solvent, as high yields of product are obtained by its use. In general, an excess of ether solvent of from 7 to 15 moles based on magnesium is profitably employed.

The manganous halide used in this process should be anhydrous since any water present destroys an equivalent amount of Grignard reagent. It was also found preferable that the manganous halide be finely divided in order to expose the maximum surface area for reaction. However, the size of the particles is not critical so that even a granular product may be employed. Another requisite of the manganous halide is that it should be oxygen free in order that higher yields may be obtained.

The carbon monoxide used in the reaction should be substantially free of oxygen, carbon dioxide and water vapor since the presence of water or oxygen in the system tends to reduce the amount of product formed.

Another variant in the present process is to avoid the presence of excess reactive halide compounds when preparing the Grignard reagent. That is, it is preferred to prepare their Grignard using an excess of magnesium. This has the effect of lowering the amount of impurities formed during the reaction, thus permitting a cleaner and less bulky product mixture from which the manganese carbonyl can be more readily separated. To this end, it is desirable to prepare the Grignard reagent so that it contains a minimum of unreacted organic halides.

The aliphatic Grignard reagents applicable to the process of this invention are hydrocarbon magnesium halides in which magnesium is bonded to a carbon atom which carbon atom is bonded either to hydrogen only or to a plurality of organic acyclic hydrocarbon groups. Thus alkyl and allyl Grignard reagents are applicable to the process of this invention.

By an allyl Grignard is meant a hydrocarbon magnesium halide containing a carbon to carbon double bond on a carbon atom which is removed by one carbon atom from the magnesium atom in the molecule.

By an alkyl Grignard is meant a hydrocarbon magnesium halide compound which contains no carbon to carbon unsaturation.

Examples of the Grignard reagent which may be used in the process of this invention include methyl magnesium bromide, ethyl magnesium iodide, n-pentyl magnesium chloride, isooctyl magnesium bromide, dodecyl magnesium iodide, allyl magnesium chloride, 2-octenyl magnesium bromide, 2-pentenyl magnesium bromide, 2-ethyl-2-propenyl magnesium iodide, 3-methyl butyl magnesium bromide, 1-methyl-2-propenyl magnesium chloride, tert-butyl magnesium iodide, and the like. Those Grignard reagents having up to about 8 carbon atoms in the hydrocarbon group are preferred as they are the most readily prepared from available starting materials.

As used in this specification the term "halide" denotes those halides having atomic numbers of at least 17. Thus the manganous halides applicable are manganous chloride, bromide and iodide. Furthermore the applicable Grignard reagent likewise include the chloride, bromide and iodide compounds.

In conducting the process of this invention the Grignard reagent can be allowed to react with manganous halide for relatively long periods of time prior to carbonylation, so long as the temperature of the mixture is maintained at below about 5° C. prior to carbonylation. Thus good yields are obtained when the intermediate is allowed to stand for as much as from 4 to 48 hours prior to carbonylation. However, good results are also obtained when shorter intermediate reaction times are employed.

Another class of preferred reagents in the process of this invention are the Grignard reagents prepared from magnesium and an aliphatic chloride since it is found that faster reaction rates are obtained in preparing the intermediate when this particular Grignard is employed. However, for small scale laboratory operations the bromide and iodide also give good results.

The manganese carbonyl produced by the process of the present invention has a variety of uses including use as a chemical intermediate in the synthesis of other compounds and as a source of a highly purified and reactive form of manganese metal which is produced on its decomposition. However, an outstanding utility of manganese carbonyl involves the fact that this compound is an antiknock agent of exceptional potency when added to gasoline for use in spark ignition internal combustion engines. An example of the benefits obtained by the use of manganese carbonyl in gasoline is as follows.

When a quantity of a commercial gasoline had added thereto an amount of manganese carbonyl sufficient to give a composition containing one gram of manganese per gallon, the octane number of the gasoline was increased from 91.8 to 96.2. The gasoline was prepared by adding the requisite quantity of crystalline manganese carbonyl to the gasoline and agitating the mixture until the manganese carbonyl was completely dissolved and thoroughly dispersed. The octane number value of the gasoline both with and without the manganese carbonyl was determined by the Research Method for determining the octane number of a fuel. The Research Method is the generally accepted test method since it gives a good indication of the fuel behavior in full-scale automotive engines under normal driving conditions. It is the method most used by commercial installations in determining the value of a gasoline or additive. The Research Method of testing antiknocks is conducted in a single-cylinder engine especially designed for this purpose and referred to as the CFR engine. This engine has a variable compression ratio and during the test the temperature of the jacket water is maintained at 212° F. and the inlet air temperature is controlled at 125° F. The engine is operated at a speed of 600 r.p.m. with a spark advance of 13° before top dead center. The test method employed is more fully described in Test Procedure D–908–55 contained in the 1956 Edition of the "ATSM Manual of Engine Test Methods for Rating Fuels."

Having fully described the nature of the present invention, it is not intended that it be limited except within the spirit and scope of the following claims.

I claim:
1. A process for the preparation of dimanganese decacarbonyl having the formula $[Mn(CO)_5]_2$ which comprises reacting carbon monoxide with an intermediate prepared from an aliphatic Grignard reagent wherein magnesium is bonded to an aliphatic carbon atom and a manganese halide in which the halogen has an atomic number of at least 17 wherein the intermediate is maintained at a temperature below about 5° C. prior to its reaction with carbon monoxide.

2. Process of claim 1 wherein the said intermediate is prepared in an ether solvent.

3. The process of claim 2 wherein said ether solvent is tetrahydrofuran.

4. Process of claim 1 wherein the maximum carbonylation temperature is 200° C. and the maximum pressure is about 20,000 p.s.i.

5. A process for the preparation of dimanganese decacarbonyl having the formula $[Mn(CO)_5]_2$ which comprises reacting carbon monoxide with an intermediate prepared from an allyl Grignard reagent and a manganous halide in tetrahydrofuran as a solvent and maintaining said intermediate below about 5° C. prior to contact with carbon monoxide and raising the reaction temperature up to about 200° C. after contacting with carbon monoxide at maximum carbon monoxide pressure of 20,000 p.s.i.

References Cited in the file of this patent

Hurd et al.: "Manganese Carbonyl," J. Am. Chem. Soc. 71 (1899), May 1949.

Owen et al.: "J. Am. Chem. Soc. 69 (1723–4), 1947.

Thorpe's Dictionary of Applied Chemistry, vol. VI, 4th Ed., Revised, Longmans, Green and Co., New York, 1943, page 137.

Webster's New International Dictionary, 2nd Ed., Unabridged, 1941, page 1103, Merriam Co., Springfield, Mass.

UNITED STATES PATENT OFFICE
CERTIFICATE OF CORRECTION

Patent No. 3,113,840            December 10, 1963

Vincent F. Hnizda

It is hereby certified that error appears in the above numbered patent requiring correction and that the said Letters Patent should read as corrected below.

Column 6, lines 33 and 34, for "manganese" read -- manganous --.

Signed and sealed this 11th day of August 1964.

(SEAL)
Attest:

ERNEST W. SWIDER
Attesting Officer

EDWARD J. BRENNER
Commissioner of Patents